Aug. 26, 1947.  R. E. DAVY  2,426,298
FISH STRINGER
Filed Dec. 22, 1945

INVENTOR.
ROBERT E. DAVY
BY
A.B.Bowman
ATTORNEY

Patented Aug. 26, 1947

2,426,298

UNITED STATES PATENT OFFICE 2,426,298

FISH STRINGER

Robert E. Davy, San Diego, Calif., assignor to James H. Myers, Jr., Grossmont, Calif.

Application December 22, 1945, Serial No. 636,831

4 Claims. (Cl. 224—7)

My invention relates to a fish stringer, more particularly for use in collectively holding a plurality of fish together for carrying the same and the objects of my invention are:

First, to provide a fish stringer of this class which is provided with a plurality of hooks which may be readily inserted in the gills of fish providing a very simple and quickly operated means for connecting fish to my fish stringer;

Second, to provide a fish stringer of this class in which a central handle member is provided for carrying fish secured on a plurality of hooks in connection therewith, and which also serves as a connecting member for a mooring chain adapted to anchor the stringer in the water during the time fish are being caught by the user of my fish stringer;

Third, to provide a fish stringer of this class in which the stringer hooks are detachable and may be connected to each other in chain like form having a fish in connection with each hook forming a link of said chain;

Fourth, to provide a fish stringer of this class including a circular frame having a plurality of pivotally stringer hooks extending downwardly therefrom which accommodate fish varying in size;

Fifth, to provide a fish stringer of this class in which the handle portion is relatively close to the stringer hooks whereby very long fish may be comfortably carried by the fisherman without dragging their tails;

Sixth, to provide a fish stringer of this class which is very compact and may be folded for convenient transportation in the fisherman's coat pocket if desired;

Seventh, to provide a fish stringer of this class from which fish are readily and easily removed;

Eighth, to provide a fish stringer of this class having very positive holding stringer hooks permitting the fish to be moored under water while the fisherman continues to fish; and Ninth, to provide a fish stringer of this class which is very simple and economical of construction, efficient in operation and which will not readily deteriorate or get out of order.

Figure 1:
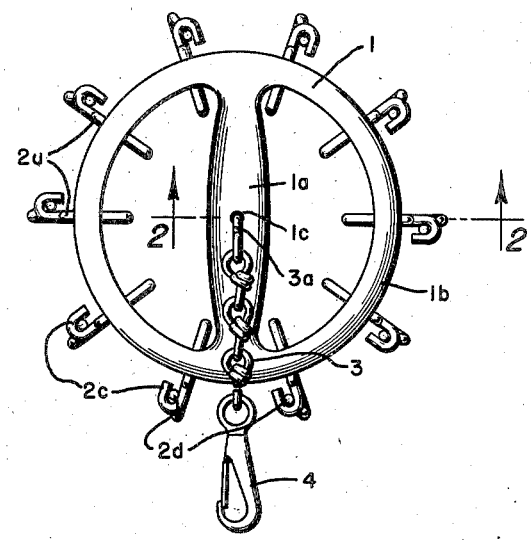
Figure 2:
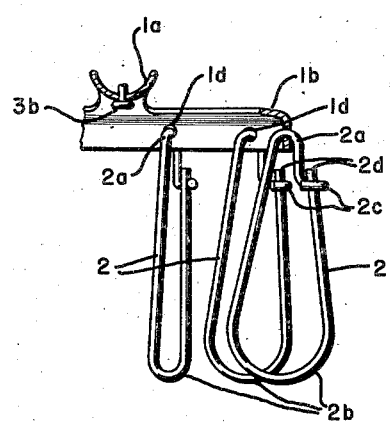

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon forming a part of this application in which:

Figure 1 is a top or plan view of my fish stringer showing portions broken away to facilitate the illustration; and Fig. 2 is a fragmentary sectional view taken from the line 2—2 of Fig. 1.

Similar characters of reference refer to similar parts and portions throughout the views of the drawing.

The frame 1, stringer hooks 2, chain 3 and the fastener 4 constitute the principal parts and portions of my fish stringer.

The frame 1, as shown in Fig. 1 of the drawing, is a circular member having an arcuate in cross section handle portion 1a extending diametrically from one side to the other in integral relation with the angular in cross section arcuate frame portion 1b, as shown best in Fig. 2 of the drawing. Secured near the middle portion of the handle portion 1a is the link 3a on the chain 3. This link 3a extends through a hole 1c in the handle portion 1a and is freely mounted therein and maintained by the head 3b of the link 3a, as shown best in Fig. 2 of the drawing. The chains 3 are preferably about 30 inches long but may be longer or shorter if desired. Secured on the extending end of the chain 3 is the fastener 4 which is arranged for use in mooring my fish stringer in the water while holding fish and fishing for more fish. The angular in cross section frame portion 1b is annular in form and is provided with holes 1d therein in which the loop portion 2a of the stringer hooks 2 are positioned, as shown best in Fig. 2 of the drawing. These loop portions 2a are freely pivoted in the holes 1d providing a very flexible arrangement of the stringer hooks 2 relatively with the frame 1. These stringer hooks 2 are each provided with enlarged downwardly extending hook portions 2b arranged to be positioned through the gills of fish for holding the same in connection with the frame 1. It will be noted that the hooks are each made of a single piece of wire and opposite ends of the piece of wire are positioned at one side of the hook below the frame portion 1b of the frame 1, as shown best in Fig. 2 of the drawing. As shown in Fig. 1 of the drawing, the hooks 2 are each provided with a U-shaped end portion 2c at one end which holds the opposite end 2d of each of these stringer hooks 2. The ends 2d extend upwardly from the hook portions 2b which are resilient and tend to maintain the end portion 2d firmly engaged in the bottom portion of the U-shaped portion 2c, thus the stringer hooks 2 securely lock at their opposite ends 2c and 2d preventing fish on said hooks from escaping or becoming removed therefrom accidentally.

The operation of my fish stringer is substantially as follows:

When the fisherman using my fish stringer catches fish, he depresses the hook portions 2b, adjacent the end portion 2d, relieving the same from the U-shaped portion 2c whereby the end 2d may be placed through the gills of the fish. Then the end portion 2d is engaged with the U-shaped portion 2c, as shown in Fig. 1 of the drawing, securely locking the fish in connection with the stringer hooks 2. If the fisherman continues to fish he may moor the fish stringer in the water and secure the same by connecting the fastener to any suitable object, thus fish in connection with the stringer are maintained in a fresh moist condition while fishing. When the fish stringer is loaded and there are several fish thereon in connection with the stringer hooks 2, fishermen may grasp the handle portion 1a and carry the fish thereby. It may be noted that the handle portion 1a is relatively close to the stringer hooks, providing an arrangement whereby long fish, in connection with my fish stringer, are conveniently carried. It will be here noted that the stringer hooks 2 may be connected in a chain whereby the end loop portions 2a may be placed through the hook portions 2b permitting the fisherman to add stringer hooks for carrying a greater number of fish than the number of hooks in connection with the frame 1. The fish in connection with the stringer hooks 2 may be connected one above the other if the hooks are arranged in the chain as hereinbefore described.

Though I have shown and described a particular construction, combination and arrangement of parts and portions, I do not wish to be limited to the particular construction, combination and arrangement but desire to include in the scope of my invention the construction, combination and arrangement substantially as set forth in the appended claims.

Having thus described my invention, what I claim as new and desire to secure by Letters Patent is:

1. In a fish stringer of the class described the combination of a one-piece annular frame member and a plurality of fish stringer hooks circumferentially stationary on said frame, pivotally connected directly therewith arranged to be inserted through the gills of fish, said annular frame member having a diametrically disposed handle portion and a chain in connection with the middle of said handle portion having a fastener on its extended end, said frame member angular in cross section at its periphery.

2. In a fish stringer of the class described the combination of a one-piece annular frame member angular in cross section at its periphery and having a diametrically disposed arcuate in cross section handle portion and fish stringer hooks circumferentially stationary and directly pivotally connected about the periphery of said frame member.

3. In a fish stringer of the class described the combination of a one-piece annular frame member angular in cross section at its periphery and having a diametrically disposed arcuate in cross section handle portion and fish stringer hooks circumferentially stationary and directly pivotally connected about the periphery of said frame member, said frame member having openings in its peripheral portions through which the fish stringer hooks extend.

4. In a fish stringer of the class described the combination of an annular frame member angular in cross section at its periphery and having a diametrically disposed arcuate in cross section handle portion and fish stringer hooks pivotally connected about the periphery of said frame member, said frame member having openings in its peripheral portions through which the fish stringer hooks extend, each of said fish stringer hooks provided with an enlarged hook portion in opposed relation to the said frame member and provided with a U-shaped end portion arranged to receive the resilient opposite end portions forming a secure connection on the opposite end of said stringer hooks.

ROBERT E. DAVY.

REFERENCES CITED

The following references are of record in the file of this patent:

UNITED STATES PATENTS

| Number | Name | Date |
|---|---|---|
| 827,855 | Farmer | Aug. 7, 1906 |
| 1,407,221 | Reimers | Feb. 21, 1922 |
| 2,200,044 | Shannon | May 7, 1940 |
| 2,226,402 | Hirschmann | Dec. 24, 1940 |
| 2,297,623 | Hickman | Sept. 29, 1942 |